United States Patent [19]
Akpa

[11] Patent Number: 6,161,021
[45] Date of Patent: Dec. 12, 2000

[54] REMOTE NOTIFICATION CONTROL IN WIRELESS COMMUNICATION DEVICE

[75] Inventor: Marcellin A. Akpa, San Diego, Calif.

[73] Assignees: Sony Corporation, Tokyo, Japan; Sony Electronics, Inc., Park Ridge, N.J.

[21] Appl. No.: 09/075,575

[22] Filed: May 11, 1998

[51] Int. Cl.[7] .............................. H04B 7/00; H04Q 7/20
[52] U.S. Cl. .......................................... 455/512; 455/527
[58] Field of Search ................................ 455/414, 415, 455/417, 445, 512, 527, 412, 513, 509; 370/443, 444, 455

[56] References Cited

U.S. PATENT DOCUMENTS

| | | | |
|---|---|---|---|
| 4,788,543 | 11/1988 | Rubin ................................. | 340/825.44 |
| 5,201,067 | 4/1993 | Grube et al. ........................... | 455/556 |
| 5,329,578 | 7/1994 | Brennan et al. ...................... | 379/88.19 |
| 5,473,671 | 12/1995 | Partridge, III ......................... | 455/445 |
| 5,600,704 | 2/1997 | Ahlberg et al. ....................... | 455/445 |
| 5,625,680 | 4/1997 | Foladare et al. ...................... | 379/199 |
| 5,751,800 | 5/1998 | Ardon .................................... | 379/134 |
| 5,752,193 | 5/1998 | Scholefield et al. .................. | 455/452 |
| 5,828,742 | 10/1998 | Khalid et al. .......................... | 379/199 |
| 5,907,604 | 5/1999 | Hsu ........................................ | 379/142 |
| 5,915,208 | 6/1999 | Collyer ................................... | 455/11.1 |
| 5,930,700 | 7/1999 | Pepper et al. .......................... | 455/414 |

FOREIGN PATENT DOCUMENTS

0676884 A2 10/1995 European Pat. Off. ......... H04M 3/42

*Primary Examiner*—Dwayne D. Bost
*Assistant Examiner*—Sonny Trinh
*Attorney, Agent, or Firm*—Limbach & Limbach L.L.P.; Seong-Kun Oh

[57] ABSTRACT

A communications system allows the user of a wireless communications device to prioritize the incoming communications by the source of the incoming communications such that even when the user disables the notification function of the wireless communications device, the user is contemporaneously alerted of certain incoming communications having predetermined priority assigned thereto. The user of wireless telecommunications device is notified of incoming communication which the user has designated with high level priority even when the user has disabled the notification function of the wireless communications device.

35 Claims, 2 Drawing Sheets

REMOTE NOTIFICATION CONTROL IN WIRELESS COMMUNICATION DEVICE

BACKGROUND OF THE INVENTION

1. Field of the Invention

The present invention relates to wireless telecommunications. More particularly, the present invention relates to method and apparatus for remotely controlling the notification function of an end-user wireless telephone communications device.

2. Description of the Related Art

With the rapid development of mobile communications in the recent years, the need for wireless communication has grown measurably. Ranging from simple pagers that provide means for alerting a user of an incoming call (for example, with the incoming caller's telephone number visually discernable on the display panel of the pager) to more functional means of sending and retrieving information through mobile communication devices such as laptop computers with communication capabilities (such as a high speed modem), personal digital assistants, and enhanced pagers with information transmission/retrieval capabilities to exchange time sensitive information such as stock quotes, weather reports, news updates, stored voice messages, as well as other information that can be readily transmitted over such medium, the capabilities of such devices are powerful.

There are also service providers such as Sprint, GTE Wireless and Pacific Bell that provide the ability to transmit such information as between two or more mobile, wireless communications devices or as between one or more stationary terminal such as a conventional telephone, desktop computers, and site-specific terminals (such as TV or radio stations) and one or more wireless communications devices.

The advantages offered by the mobile, wireless communications devices are countless. In particular, fast and prompt transmission and retrieval of a variety of information can be easily achieved. Wireless communications devices such as cellular telephones and pager systems include means to notify the user of such devices of an incoming communication. Such notification function can include a ringer function which generates an audible sound to notify the user of the communications device that there is an incoming communication. Another example of the notification function can include physically vibrating the communications device such that the user, by virtue of being in physical contact with the communications device, can physically sense the device in constant or intermittent vibration. Aside from the ringer and vibration notifications, there exists other means of alerting the communications device user that there is an incoming communication.

On the other hand, certain limitations still exist in terms of flexibility in managing or controlling the transmission/retrieval of information. For instance, many wireless devices have little or no ability to prioritize the retrieval of an incoming transmission such as an incoming telephone call received by a cellular telephone, for instance. In particular, cellular telephones currently do not have the capability to prioritize or screen incoming calls in accordance with the cellular telephone user's prioritized level of urgency. Indeed, at present, a cellular telephone, when turned on and placed on stand-by mode to receive calls, will ring or buzz irrespective of the caller's identity to notify the user of the cellular telephone that there is an incoming call.

When the user of the wireless communications device does not wish to be disturbed for a period of time, the user may turn down the notification function. When the notification function is turned down by the user, such as by lowering or turning off the ringer volume control or the vibration notification mode, even when there is an incoming communication received by the wireless communications device, the user is not aware of such communication being received by the wireless device.

After a predetermined number of rings or a given time period of physically vibrating the wireless communications device, the incoming communication is usually routed to a message center for storing the incoming communication such that the user may receive the incoming communication at a later time.

Therefore, when the notification function of the wireless communications device is disabled by the user, the source of the incoming communications, usually another person placing a telephone call or sending a pager request to the wireless communications device, must wait during the time the device's notification function elapses through the predetermined number of rings or the pre-set time period for vibration. This may cause substantial frustration on the part of the party sending the communication and significant delay in conveying the intended communication since the message will either be temporarily stored the message center for later retrieval or the sending party must repeatedly retransmit the same message until the wireless device user activates the device's notification function.

Conversely, the user of the wireless communications device has no alternatives but to either leave on the notification function of the wireless communications device and risk being interrupted periodically, or, disable the notification function of the communications device and risk not receiving an important message in a timely manner.

SUMMARY OF THE INVENTION

In view of the foregoing, it is an object of the present invention to provide a method and apparatus for providing a system for remotely controlling the notification mode of a wireless communications device.

It is a feature of the present invention to provide a communications system which allows the user of a wireless communications device to prioritize the incoming communications by the source of the incoming communications such that even when the user disables the notification function of the wireless communications device, the user is contemporaneously alerted of certain incoming communications with predetermined priority.

In this manner, an advantage of the present invention is to allow a user of wireless telecommunications device to be notified of certain incoming communications which the device user has defined as sufficiently important even when the device user has disabled the notification function of the wireless communications device.

Accordingly, a communication system for information transmission from a remote source in accordance with one embodiment of the present invention includes a signal provider for receiving communication information from a remote source and in accordance therewith generating a control signal, the communication information including a predetermined selection code, and a wireless device having a first operation mode and a second operation mode the wireless device configured to selectively operate between the first and second operation modes in accordance with the control signal, where the signal provider determines whether the wireless device is operating in a first or second operation mode, and in accordance therewith, selectively transmits the communication information to the wireless device.

A method of controlling remote notification mode for a wireless device in accordance with another embodiment of the present invention includes the steps of receiving an incoming signal, determining the operating mode of the wireless device and in accordance therewith, generating an operating mode signal, generating a remote notification mode signal in accordance with the operating mode signal, and transmitting the incoming signal in accordance with the remote notification mode signal.

These and other objects, features and advantages of the present invention will be understood upon consideration of the following detailed description of the invention and the accompanying drawings.

DESCRIPTION OF THE PREFERRED EMBODIMENT

Figure 1:
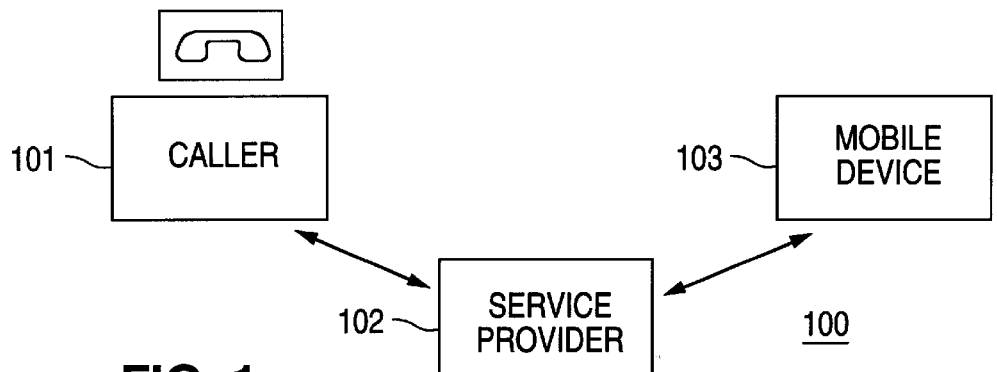
FIG. 1 illustrates a block diagram of a wireless communications system in accordance with one embodiment of the present invention.

FIG. 1 illustrates a wireless communication system 100 in accordance with one embodiment of the present invention. As shown, in the wireless communication system 100 in accordance with the present invention, there is provided a caller 101 which transmits a message (voice, and/or date or the like) to another party. In accordance with one embodiment of the present invention, attached to the incoming message from a caller 101 is an identification code which is uniquely assigned for the specific caller. For example, depending upon the party who initiates the initial call al the caller 101, the identification code is transmitted along with the message to the service provider 102.

The transmitted message from the caller 101 is then transmitted to a service provider 102 which is configured to receive the incoming message transmission with the identification code and accordingly, process the identification code and relay the incoming message transmission received to a remote device 103. As an example of the remote device, there is shown in FIG. 1 a mobile device 103 which can include, for example, a cellular telephone, a Personal Communication System ("PCS"), a Personal Handy-Phone System ("PHS"), and pager. By way of example, the user-specific identification code can include a multiple-digit sequence of alphanumeric codes which is uniquely pre-assigned to each calling party at the time the user of the mobile device 103 provides the access number for that mobile device 103.

When the service provider 102 receives the information identifying the designated mobile device 103 to which the incoming message transmission from the caller 101 is to be sent as well as the identification code identifying the calling party from the caller 101, the service provider 102 and the mobile device 103 perform a series of steps in accordance with the present invention, and as further discussed below with FIGS. 2 and 3.

Figure 2:
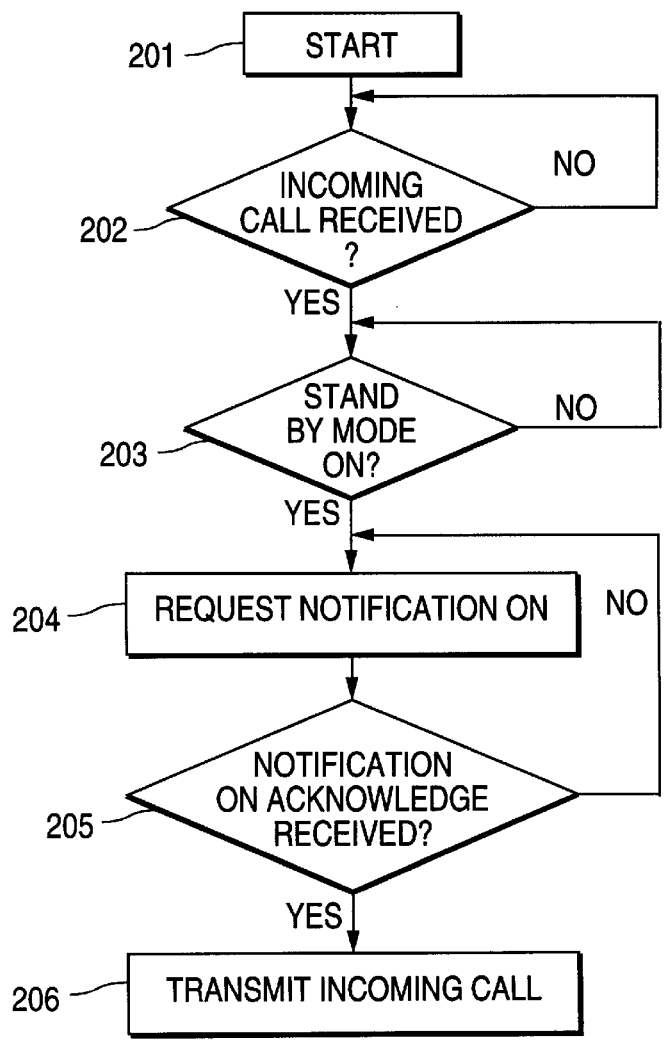
FIG. 2 illustrates a flow chart of the remote notification control method in a wireless communications system in accordance with one embodiment of the present invention.

FIG. 2 illustrates a flow chart of the remote notification control method in the wireless communications system 100 (FIG. 1) in accordance with one embodiment of the present invention. As shown, when the caller 101 (FIG. 1) initiates a call for transmission to the service provider 102 (FIG. 1), the remote notification control in accordance with one embodiment of the present invention begins at step 201 and confirms at step 202 that an incoming message transmission is received. If at step 202 the receipt of the incoming message from the caller 101 is not confirmed by the service provider 102, then the procedure returns follows the return loop to the beginning of step 202 to confirm whether an incoming message from the caller 101 is received by the service provider 102.

Otherwise, if the message transmitted by the caller 101 is received by the service provider 102, then at step 203, it is determined whether or not the stand-by mode on the mobile device 103 (FIG. 1) is on. Upon determination that the mobile device 103 is in stand-by mode at step 203, the service provider 102 (FIG. 1 at step 204 then provides a request notification signal to the mobile device 103. When the mobile device 103 receives the request notification signal from the service provider 102, the mobile device 103 turns on the notification function irrespective of whether the user of the mobile device 103 consciously turned the notification function off. Also, the mobile device 103 then transmits an acknowledgement signal to the service provider 102 indicating that the notification function is in the on-mode. As previously discussed, the notification function of the mobile device 103 can include, for example, an alarm or a motion signal generator such as vibration mode.

At step 205, the service provider 102 (FIG. 1) determines whether an acknowledgement signal confirming the receipt of the request notification signal is transmitted from the mobile device 103 to the service provider 102. When the service provider 102 receive an acknowledgement signal from the mobile device 103 that the notification function is on, then the procedure proceeds to step 206.

Finally, at step 206 the incoming message from the caller 101 is transmitted to the mobile device 103, triggering the notification function of the mobile device to notify the user of the mobile device 103 that a call or a message is being transmitted.

In the manner described above, in accordance with the present invention, the user of a mobile device 103 such as a cellular telephone can selectively establish an exclusive group of callers, each assigned with a predetermined, caller-specific code, to bypass the disabled notification function of the mobile device, and alert the user of the mobile device 103 of a real-time call or message transmission. In this manner, the user of the mobile device is able selectively prioritize those messages and/or calls that he wishes to be notified at the time of the message/call transmission, from those less urgent messages or calls which the mobile device user has chosen to assign a lower priority.

Figure 3:
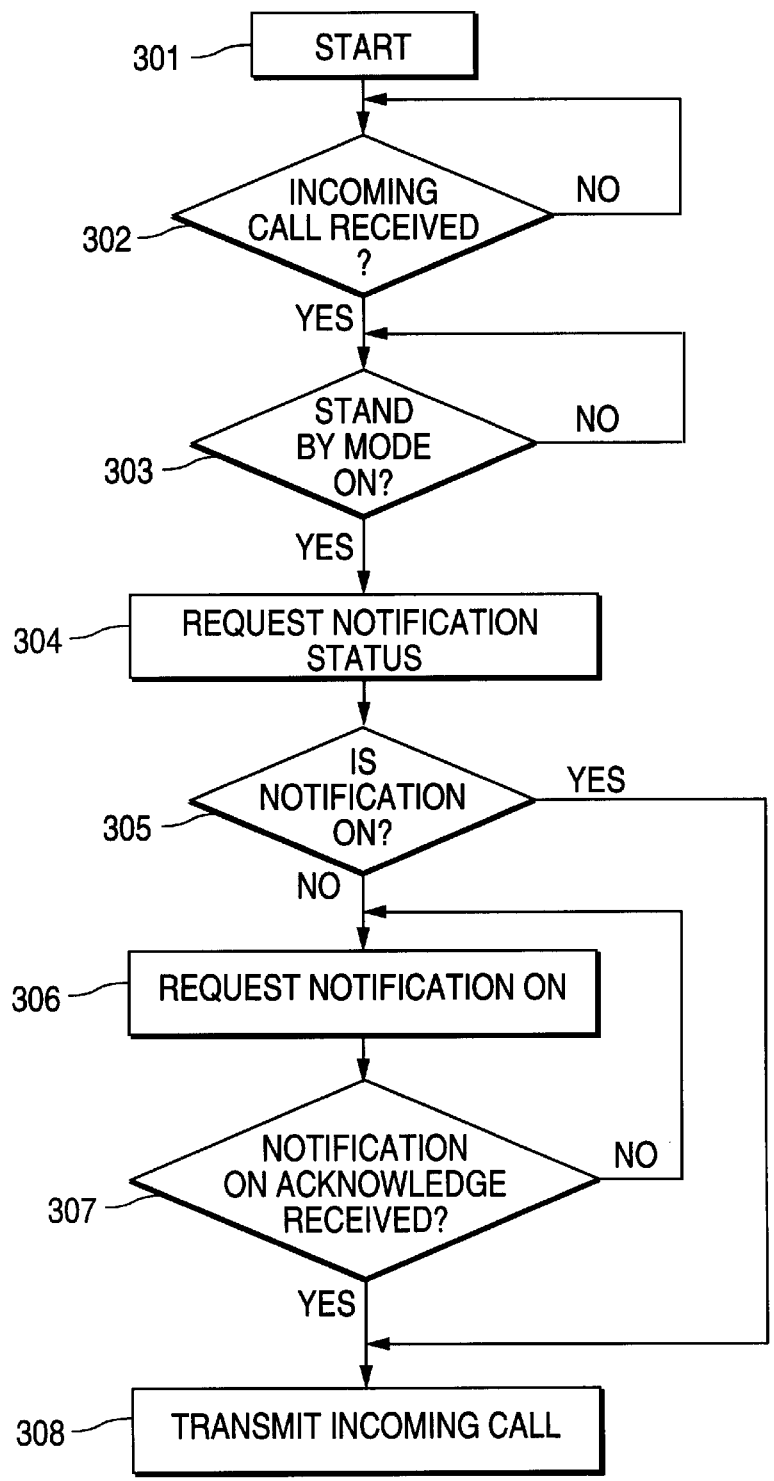
FIG. 3 illustrates a flow chart of the remote notification control method in a wireless communications system in accordance with another embodiment of the present invention.

FIG. 3 illustrates a flow chart of the remote notification control method in the wireless communications system 100 (FIG. 1) in accordance with another embodiment of the present invention. As can be seen from FIG. 3, the same illustrated steps as those in FIG. 2 are configured to operate in similar manner, and therefore, will not be repeated herein.

As shown, the embodiment of FIG. 3 has an additional step 305. In other words, upon determination that the mobile device 103 is in stand-by mode at step 303, at step 304, the service provider 102 (FIG. 1) provides a request notification signal to the mobile device 103. When the mobile device 103 receives the request notification signal from the service provider 102, the mobile device 103 determines whether the notification function is in an on or an off mode. If the notification function is in an on mode, the procedure of the present invention proceeds directly to step 308. On the other hand, if it is determined that the notification function is in an off mode, then at step 306, the service provider 102 transmits a signal to the mobile device 103 to turn on the notification function. When the mobile device 103 successfully turns on its notification function, it returns a notification on acknowledgement signal to the service provider 102. If the service provider 102 does not receive a notification on acknowledgement signal from the mobile device 103 at step 307, then the service provider 102 transmits a further signal to the mobile device 103 requesting that the notification function be turned on. This procedure is repeated until the mobile device 103 turns its notification function on and returns an acknowledgement signal to the service provider 103 confirming the same.

When it is confirmed that the notification function is placed in an on-mode, the service provider 102 transmits the incoming call/message from the caller 101 to the mobile device 103 at step 308, triggering the notification function of the mobile device to notify the user of the mobile device 103 that a call/message is being transmitted thereto.

In accordance with yet another embodiment of the present invention, in the case that a caller is unable to provide the caller specific code along with its message/call transmission to the service provider, at the step of verifying the status of the mobile device's notification function (step 305), rather than bypassing or enabling the notification function which was disabled by the user of the mobile device 103 as illustrated in the embodiment shown in FIG. 3, it is alternatively possible to route the incoming call to a message center such as an answering machine or the like preconfigured for the mobile device 103.

The remote notification control method in accordance with the embodiment of the present invention as illustrated in FIG. 3 as the advantage that, in the case where the caller 101 is unable to input the pre-designated, caller-specific code, the base station (for example, the service provider 102) can be configured to direct the incoming call from the caller 101 to a message center without attempting to ring the remote telephone (for example, the mobile device 103) if it is determined that the notification function of the remote device (such as volume) is off.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A communication system for information transmission, comprising:
   a signal provider for receiving communication information from a remote source and in accordance therewith generating a control signal, said communication information including a predetermined selection code, said selection code capable of prioritizing the transmission of said corresponding communication information; and
   a wireless device having a first operation mode and a second operation mode, said wireless device configured to selectively operate between said first and second operation modes in accordance with said control signal, wherein said signal provider determines whether said wireless device is operating in a first or second operation mode, and in accordance therewith, selectively transmits said communication information to said wireless device; and further
   wherein when said predetermined selection code for said communication information corresponds to a high priority transmission and said wireless device is operating in said second operation mode said signal provider is configured to place said wireless device in said first mode and to transmit said communication information.

2. The system of claim 1 wherein said first operation mode includes a wireless device volume control ON mode, and further, wherein said second operation mode includes a wireless device volume control OFF mode.

3. The system of claim 1 wherein said first operation mode includes a wireless device vibration control ON mode and further wherein said second operation mode includes a wireless device vibration control OFF mode.

4. The system of claim 1 wherein said signal provider is further configured to transmit a request control signal, wherein said wireless device is configured to receive said request control signal and to provide an acknowledge signal.

5. The system of claim 4 wherein said signal provider is configured to receive said acknowledge signal from said wireless device and in accordance therewith transmit said communication information.

6. The system of claim 1 wherein said wireless device is a cellular telephone, and further, wherein said communication information includes voice data.

7. The system of claim 6 wherein said data information includes a telephone call or a pager call.

8. The system of claim 1 wherein said wireless device is a pager, and further, wherein said communication information is data information.

9. The system of claim 8 wherein said data information includes information generated by the remote source.

10. The system of claim 1 wherein said wireless device includes a Personal Communication System or a Personal Handy-Phone System.

11. The system of claim 1 wherein said wireless device is a personal digital assistant, and further, wherein said communication information includes audio data.

12. The system of claim 11 wherein said communication information includes video data.

13. The system of claim 1 wherein said signal provider includes a message center for temporarily storing information.

14. The system of claim 13 wherein said communication information is selectively transmitted to either of said wireless device or said message center.

15. A method of controlling remote notification mode for a wireless device, said method comprising the steps of:
   receiving an incoming signal;
   determining the operating mode of said wireless device and in accordance therewith, generating an operating mode signal;
   generating a remote notification mode signal in accordance with said operating mode signal; and
   transmitting said incoming signal in accordance with said remote notification mode signal;
   wherein when said operating mode of said wireless device indicates a non-active state of said wireless device and said incoming signal includes a high priority transmission level, said remote notification mode signal configured to place said wireless device in an active state.

16. The method of claim 15 wherein said operating mode of said wireless device includes one of stand-by mode, power-on mode and power-off mode.

17. The method of claim 16 wherein said operating mode signal in said step of generating a remote notification mode signal corresponds to said stand-by mode.

18. The method of claim 15 wherein said incoming signal includes a user-specific code and further, wherein said step of generating said remote notification mode signal includes the step of determining the level of pre-assigned priority of said user-specific code.

19. The method of claim 18 wherein said step of transmitting said incoming signal includes the step of transmitting said incoming signal to said wireless device if said level of pre-assigned priority of said user-specific code is above a predetermined priority level, and transmitting said incoming signal to a remote storage device if said level of pre-assigned priority of said user-specific code is below said predetermined priority level.

20. The method of claim 19 wherein said remote storage device includes a message center.

21. The method of claim 19 wherein said predetermined priority level is established by the user of said remote device.

22. The method of claim 19 wherein said notification function includes one of an audible alarm and a vibration mechanism.

23. A communication system, comprising:
   a signal provider for receiving communication signal from a remote source, said signal configured to determine the priority of said communication signal transmission; and
   a wireless device capable of operating in one of a stand-by mode and an active mode;
      wherein when the wireless device is operating in said stand-by mode and said priority of said communication signal transmission is within a predetermined group of high priority transmission, said signal provider is configured to place said wireless, device in said active mode such that a user of said wireless device is alerted of the incoming communication signal transmission.

24. The system of claim 23 wherein said wireless device is not capable of alerting said user of said incoming communication signal in said stand-by mode.

25. The system of claim 23 wherein said predetermined group of high priority transmission is determined by said user of said wireless device.

26. The system of claim of claim 23 wherein said wireless device is capable of receiving and/or transmitting communication signal when in said active mode.

27. The system of claim 23 wherein said user is alerted of said incoming communication signal transmission by one of an audible alert and a vibration alert.

28. The system of claim 23 wherein said remote source includes a third party calling device capable of transmitting said communication signal.

29. The system of claim 23 wherein said communication signal includes one of an audio signal, a video signal or a combination of audio and video signals.

30. A method of controlling notification mode of a wireless device, comprising the steps of:
   receiving an incoming communication signal;
   determining a priority of transmitting said communication signal to a wireless device;
   determining a notification mode of said wireless device; and
   when said notification mode is disabled and said transmission priority is high, transmitting a request notification signal to said wireless device, and upon receipt of a notification acknowledge signal from said wireless device, transmitting said communication signal to said wireless device.

31. The method of claim 30 wherein when said priority of said communication signal is low and said notification mode is disabled, rerouting said communication signal.

32. The method of claim 31 wherein said communication signal is re-routed to a message center capable of temporarily storing said communication signal.

33. The method of claim 30 wherein said priority of said communication signal is predetermined by the user of said wireless device.

34. The method of claim 30 wherein said notification mode includes one of a vibration alert and an audible alert.

35. The method of claim 30 wherein said communication signal includes one of an audio signal, a video signal or a combination of audio and video signals.

* * * * *